Feb. 22, 1955 R. E. BAREFORD 2,702,889
PIGTAIL CONNECTION BETWEEN RELATIVELY ROTATABLE MEMBERS
Filed March 27, 1950

INVENTOR:
ROBERT E. BAREFORD
BY Herbert E. Metcalf
HIS PATENT ATTORNEY

United States Patent Office 2,702,889
Patented Feb. 22, 1955

2,702,889

PIGTAIL CONNECTION BETWEEN RELATIVELY ROTATABLE MEMBERS

Robert E. Bareford, Burbank, Calif., assignor to Northrop Aircraft, Inc., Hawthorne, Calif., a corporation of California Application March 27, 1950, Serial No. 152,043

8 Claims. (Cl. 339—2)

My invention relates to direct electrical connections between relatively rotatable members, and more particularly to electrical connections suitable for use between the gimbals of a gyroscope assembly.

It is an object of the invention to provide direct electrical connections between adjacent relatively moveable members that will provide a minimum of frictional resistance to said movement.

It is another object of the invention to provide a direct electrical connector between relatively rotating members that will have a frictional resistance that is relatively uniform over a wide range of rotation of said members.

In brief, the invention comprises a flexible electrical connection or pigtail between two relatively rotating spaced members having a common axis, the pigtail being attached near the midpoint thereof to a freely floating ring rotatable about substantially the same axis as the axis of the members. The pigtail, as is customary, is longer than the straight line distance between the attachment points on said members to form a loop, and it is preferred that the floating ring have a lesser radius than that of the members at the pigtail attachment points. Thus the apex of the loop is attached to the ring, and when multiple pigtails are used, as is customary in gyroscope mountings, each loop apex is attached to the ring at a different point around the ring, thus preventing these apices from touching during rotation as would be possible if these loops were free in space. A range of relative rotation of about 110° between the members has been obtained with a substantially uniform low friction due to the pigtails over the entire range, using multiple leads fastened according to the present invention.

The invention may be more fully understood by reference to the drawings in which.

Figure 1:
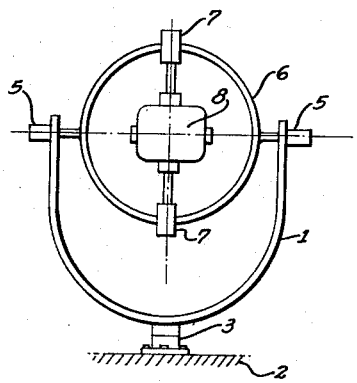
Figure 1 is a diagram showing a typical gyroscope mounting, and positions where the pigtail of the present invention can be used.

The usual gyroscope mounting comprises a yoke 1 rotatable on a foundation member 2 in yoke bearing 3. The yoke 1 is provided with coaxial yoke-gimbal bearings 5 which support a gimbal 6, which on coaxial gimbal bearings 7 supports a gyroscope 8. The axis of the gimbal bearings 7 is at a right angle to the axis of the yoke-gimbal bearings 5.

In order to drive the gyro, and to furnish leads for electrical position sensing devices customarily used, electrical leads are needed across at least one of the gimbal bearings 7, one of the yoke-gimbal bearings 5, and across the yoke bearing 3. Direct electrical leads are customarily used, as ring and brush assemblies are complicated, and may vary in electrical resistance, and because relative rotation across any of the gyro assembly bearings can usually be limited to less than 100°. In some gyro installations, 20 or more leads or pigtails may be present across yoke bearing 3, for example.

Figure 2:
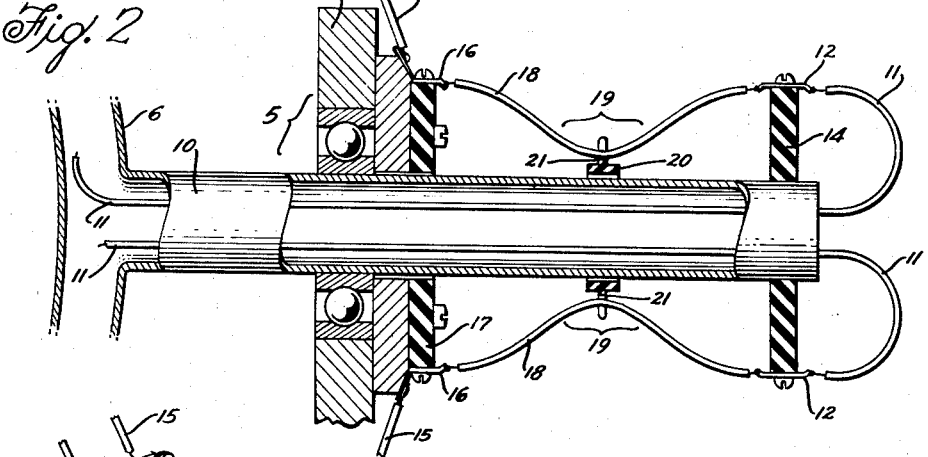
Figure 2 is a diagrammatic sectional view of a yoke-gimbal bearing, showing one preferred lead across the bearing constructed in accordance with the present invention.

As frictional restraint on the gyro 8 must be held to a minimum, and as it is highly desirable that whatever friction be present due to the use of electrical connections be substantially uniform over the entire range of relative motion between the rotatable members, a novel pigtail arrangement is used as shown in Figure 2, only two leads being there shown. The bearing illustrated in Figure 2 is one of the yoke-gimbal bearings 5, the gimbal 6 being rotatable with respect to the yoke 1.

A gimbal shaft 10 is preferably hollow, and electrical wires 11 from the gimbal 6 pass through the shaft 10 to the open end thereof. These wires there curve outwardly and are attached to a gimbal pigtail connector 12 on a gimbal shaft disc 14 of insulating material. Electrical wires 15 on the yoke 1 are attached to yoke pigtail connectors 16 on a yoke disc 17 attached to yoke 1, this latter disc also being of insulating material. The radial distances of the gimbal pigtail connectors 12 and the yoke pigtail connectors 16 from the axis of rotation of the gimbal shaft 10 is preferably made the same.

A flexible pigtail 18 is fastened at one end to a yoke pigtail connector 16 and at the other end to a corresponding gimbal pigtail connector 12, and is made longer than the straight line distance therebetween to form a loop 19 preferably bent inwardly toward gimbal shaft 10.

Around gimbal shaft 10 substantially midway between discs 14 and 17 is positioned a floating ring 20 slightly larger than the shaft to rotate freely thereon. This ring, preferably of insulative material, is provided with a flange 21 extending outwardly, and the apex of each pigtail loop 19 is attached to this flange 21. This attachment stabilizes the loops 19 during relative rotation of the discs 14 and 17, and has been found to provide a very uniform pigtail friction over angles up to at least 110°.

Figure 3:
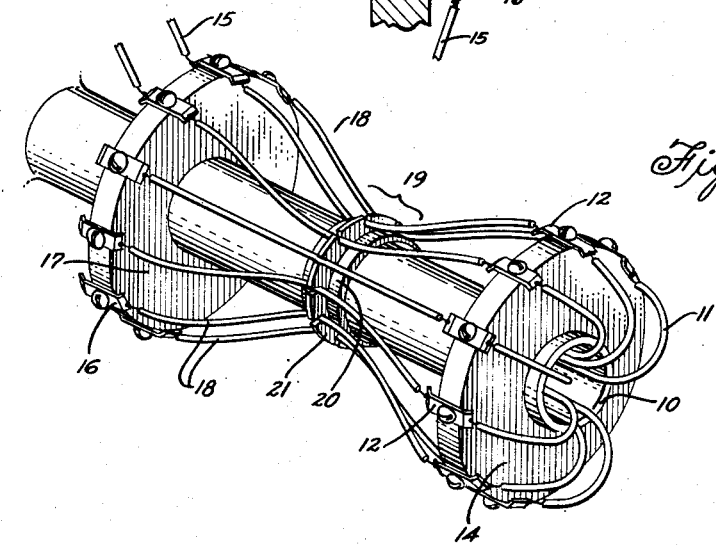
Figure 3 is a diagrammatic perspective view showing the arrangement of multiple pigtails, each fashioned as shown in Figure 2.

The type of pigtail connection just above described is particularly useful when a large number of pigtails are used across the same bearing. In this case, the circumferential angular spacing of the loop apex insertions in ring flange 21 is made to be substantially the same as the angular spacings of the yoke and gimbal pigtail connectors 12 and 16 respectively, as shown in diagrammatic perspective in Figure 3. It will be noted that the apex of each loop is thus stabilized and spaced relative to the apices of adjacent loops so that, as relative rotation of the discs 12 and 16 occurs, the loop apices cannot touch or tangle as is common when unsecured loops are used. Such touching or tangling has been found to change the pigtail friction between discs when relative rotation occurs, thereby giving rise to non-uniform and unpredictable pigtail friction forces during use of the gyro. The present invention provides predictable and substantially uniform friction over the entire range. As friction forces on gyro support bearings affect the drift rate of the supported gyro, such forces, when calculable and predictable, can be used as drift correction factors, thereby increasing gyro accuracy.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A pigtail connection between two spaced and relatively rotatable members having a common axis comprising a flexible electrical conductor extending between said members and attached to each of said members at substantially the same radial distance from the common axis of said members, said conductor being longer than the straight line distance between the member attachment points to form a loop directed inwardly toward said common axis, and a ring member freely rotatable around substantially the same axis as that of said members and positioned on said axis at a point which is geometrically intermediate between said attachment points, the apex of said loop being attached to said ring member.

2. A pigtail connection between two spaced and relatively rotatable members having a common axis comprising a flexible electrical conductor extending between said members and attached to each of said members at substantially the same radial distance from the common axis of said members, said conductor being longer than the straight line distance between the member attachment points to form a loop directed inwardly toward said common axis and a ring member freely rotatable around substantially the same axis as that of said members and positioned on said axis at a point which is geometrically intermediate between said attachment points, said ring member having an outwardly extending flange thereon, the apex of said loop being attached to said flange.

3. Means for making a plurality of direct electrical connections between a pair of relatively rotatable members which comprises, means positioning said members on a common axis, a plurality of electrically conductive flexible pigtails connected across said members and attached thereto at points circumferentially spaced and at substantailly the same radial distances on both members, each of said pigtails being longer than the straight line distance between member attachment point to form a loop extending toward said axis, all of said pigtails being of substantially the same length to place the apices thereof substantially at the same radial distance from said axis, and a ring member rotatable around substantially the same axis as that of said members and positioned on said axis at a point which is geometrically intermediate between said attachment points, each of the apices of said pigtails being attached to said ring member, said apical attachments being spaced on said ring member in accordance with the circumferential end attachments of the corresponding pigtails.

4. Electrical connection means comprising a rotatable shaft, a bearing for said shaft, a shaft mounted member, a bearing mounted member, each of said members having a plurality of electrical contacts circumferentially spaced around the axis of said shaft at the same radial distance therefrom to form corresponding contact pairs and having substantially the same straight line distance between the contacts of each pair, a flexible electrically conductive pigtail connecting the contacts of each pair, said pigtails being of substantially the same length and longer than said straight line distance between said contacts to form loops extending toward said axis, and a ring member rotatable around said axis and positioned on said axis at a point which is geometrically intermediate between said attachment points, the apices of said loops being attached to said ring member.

5. Electrical connection means comprising a rotatable shaft, a bearing for said shaft, a shaft mounted member, a bearing mounted member, each of said members having a plurality of electrical contacts circumferentially spaced around the axis of said shaft at the same radial distance therefrom to form corresponding pairs and having substantially the same straight line distance between the contacts of each pair, a flexible electrically conductive pigtail connecting the contacts of each pair, said pigtails being of substantially the same length and longer than said straight line distance to form loops extending toward said axis, and a ring member rotatable around said axis and positioned on said axis at a point which is geometrically intermediate between said attachment points, the apices of said loops being attached to said ring member, said apex attachments being circumferentially spaced around said ring member in accordance with the circumferential spacing of said corresponding contact pairs.

6. Apparatus in accordance with claim 5 wherein said shaft extends between said members, and said ring is loosely mounted to rotate on said shaft.

7. Means for minimizing the possible non-linear frictional effects of a plurality of electrical connections between a pair of relatively rotatable members which comprises means positioning said members on a common axis, a plurality of electrically conductive flexible pigtails connected across said members and attached thereto at points circumferentially spaced and at substantially the same radial distances on both members, each of said pigtails being longer than the straight line distance between member attachment point to form a loop extending toward said axis, all of said pigtails being of substantially the same length to place the apices thereof substantially at the same radial distance from said axis, and a ring member freely rotatable around substantially the same axis as that of said members, each of the apices of said pigtails being attached to said ring member, said apical attachments being spaced on said ring member in accordance with the circumferential end attachments of the corresponding pigtails.

8. Means for rendering uniform the possible non-linear frictional effects of a plurality of electrical connections between a pair of relatively rotatable members which comprises means positioning said members on a common axis, a plurality of electrically conductive flexible pigtails connected across said members and attached thereto at points circumferentially spaced and at substantially the same radial distances on both members, each of said pigtails being longer than the straight line distance between member attachment point to form a loop extending toward said axis, all of said pigtails being of substantially the same length to place the apices thereof substantially at the same radial distance from said axis, and a ring member rotatable around substantially the same axis as that of said members, each of the apices of said pigtails being attached to said ring member, said apical attachments being spaced on said ring member in accordance with the circumferential end attachments of the corresponding pigtails.

References Cited in the file of this patent

UNITED STATES PATENTS

| | | |
|---|---|---|
| 1,247,357 | Young | Nov. 20, 1917 |

FOREIGN PATENTS

| | | |
|---|---|---|
| 588,686 | Germany | Nov. 23, 1933 |
| 628,591 | Germany | Apr. 7, 1936 |
| 825,780 | France | Dec. 16, 1937 |